(12) United States Patent
Zhan et al.

(10) Patent No.: US 11,431,923 B2
(45) Date of Patent: Aug. 30, 2022

(54) METHOD OF IMAGING BY MULTIPLE CAMERAS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Wenxi Zhan, Guangdong (CN); Liang Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 106 days.

(21) Appl. No.: 16/913,720

(22) Filed: Jun. 26, 2020

(65) Prior Publication Data

US 2020/0412981 A1 Dec. 31, 2020

(30) Foreign Application Priority Data

Jun. 28, 2019 (CN) .......................... 201910578358.5

(51) Int. Cl.
*H04N 5/341* (2011.01)
*H04N 5/073* (2006.01)
*H04N 5/232* (2006.01)

(52) U.S. Cl.
CPC ............. *H04N 5/341* (2013.01); *H04N 5/073* (2013.01); *H04N 5/23232* (2013.01)

(58) Field of Classification Search
CPC .... H04N 5/341; H04N 5/073; H04N 5/23232; H04N 5/3415; H04N 5/23238; H04N 5/2258
See application file for complete search history.

(56) References Cited

U.S. PATENT DOCUMENTS 5,987,164 A 11/1999 Szeliski et al.
9,544,501 B2 1/2017 Laroia
(Continued)

FOREIGN PATENT DOCUMENTS

CN 1544990 A 11/2004
CN 101779445 A 7/2010
(Continued)

OTHER PUBLICATIONS

Chinese Third Office Action with English Translation for counterpart CN Application 201910578358.5 dated Jun. 3, 2021. (16 pages).

(Continued)

*Primary Examiner* — Nicholas G Giles
(74) *Attorney, Agent, or Firm* — Young Basile Hanlon & MacFarlane, P.C.

(57) ABSTRACT

An imaging method, an apparatus for imaging, a non-transitory storage medium, and an electronic device are provided. The electronic device includes a first camera and a plurality of second cameras. Regions captured by the plurality of second cameras overlap with an edge of a region captured by the first camera. An image capturing request for an object to be captured is received, the first camera may be driven to perform image capturing to the object based on the image capturing request to obtain a base image, the plurality of second cameras may be driven to perform image capturing to obtain a plurality of second images, image synthesis may be performed to the plurality of second images and the base image to obtain a final image corresponding to the image capturing request.

20 Claims, 6 Drawing Sheets

(56) References Cited

U.S. PATENT DOCUMENTS

| | | | | |
|---|---|---|---|---|
| 2011/0122308 | A1* | 5/2011 | Duparre | H04N 9/04 |
| | | | | 348/340 |
| 2015/0293429 | A1 | 10/2015 | Laroia | |
| 2018/0075587 | A1 | 3/2018 | Swami et al. | |
| 2018/0157930 | A1* | 6/2018 | Rutschman | G06K 9/4609 |
| 2018/0176541 | A1 | 6/2018 | Abbas et al. | |
| 2019/0098180 | A1* | 3/2019 | Tachi | H04N 5/04 |

FOREIGN PATENT DOCUMENTS

| | | | |
|---|---|---|---|
| CN | 103369217 | A | 10/2013 |
| CN | 104272727 | A | 1/2015 |
| CN | 104349030 | A | 2/2015 |
| CN | 104363370 | A | 2/2015 |
| CN | 105205796 | A | 12/2015 |
| CN | 105635579 | A | 6/2016 |
| CN | 105959525 | A | 9/2016 |
| CN | 107566693 | A | 1/2018 |
| CN | 207053645 | U | 2/2018 |
| CN | 107911628 | A | 4/2018 |
| CN | 108900763 | A | 11/2018 |
| CN | 108924420 | A | 11/2018 |
| CN | 109040570 | A | 12/2018 |
| CN | 109167911 | A | 1/2019 |
| CN | 109379528 | A | 2/2019 |
| CN | 109639974 | A | 4/2019 |
| CN | 208798074 | U | 4/2019 |
| CN | 110290322 | A | 9/2019 |

OTHER PUBLICATIONS

Extended European Search Report for EP Application 20182033.9 dated Feb. 24, 2021. (11 pages).

International search report, PCT/CN2020/098123, dated Aug. 12, 2020 (9 pages).

English Translation First Office Action from China patent office in a counterpart Chinese patent Application 201910578358.5, dated Jul. 1, 2020 (17 pages).

Europe partial search report, EP20182033 dated Nov. 23, 2020 (13 pages).

Second Office Action with English Translation of China patent office in a counterpart Chinese patent Application 201910578358.5, dated Jan. 12, 2021 (19 pages).

Chinese Rejection Decision with English Translation for CN Application 201910578358.5 dated Sep. 7, 2021. (15 pages).

Indian Examination Report for IN Application 202014027147 dated Nov. 9, 2021. (7 pages).

Communication pursuant to Article 94(3) EPC for EP Application 20182033.9 dated Jun. 17, 2022. (6 pages).

* cited by examiner

METHOD OF IMAGING BY MULTIPLE CAMERAS, STORAGE MEDIUM, AND ELECTRONIC DEVICE

CROSS-REFERENCE TO RELATED APPLICATION(S)

The present application claims priority to Chinese Patent Application No. 201910578358.5, filed on Jun. 28, 2019, the contents of which are herein incorporated by reference in its entirety.

TECHNICAL FIELD

The present disclosure relates to the field of image processing, and in particular to an imaging method, a non-transitory storage medium, and an electronic device.

BACKGROUND

Currently, a user may usually use an electronic device having a camera to capture images and may record sceneries and things happened around the user via the electronic device whenever and wherever possible. However, because of hardware defects of the camera, a middle region of the captured image may be fine whereas edged regions may be relatively blurry, such that general quality of the entire image may be poor.

SUMMARY

According to a first aspect of the present disclosure, an imaging method may be provided and performed by an electronic device. The electronic device includes a first camera in a first type and a plurality of second cameras in a second type, a second region captured by each of the plurality of second cameras partly overlap with a first region captured by the first camera at an edge part of the first region, and the method includes operations of: receiving an image capturing request for an object to be captured; performing an image capturing operation for the object to be captured via the first camera based on the image capturing request to obtain a first image, and setting the first image to be a base image; performing another image capturing operation for the object to be captured via the plurality of second cameras to obtain a plurality of second images; and performing image synthesis for the plurality of second images and the base image to obtain a synthesized image, and setting the synthesized image to be a target image corresponding to the image capturing request.

According to a second aspect of the present disclosure, an electronic device is provided and includes a processor, a non-transitory memory, a first camera in a first type and a plurality of second cameras in a second type. A second region captured by each of the second cameras partly overlaps with a first region captured by the first camera at an edge part of the first region, a computer program is stored in the non-transitory memory, and the processor is arranged to invoke the computer program to perform operations of: receiving an image capturing request for an object to be captured; performing an image capturing operation for the object to be captured via the first camera based on the image capturing request to obtain a first image, setting the first image to be a base image; performing another image capturing operation for the object to be captured via the plurality of second cameras to obtain a plurality of second images; and performing image synthesis for the plurality of second images and the base image to obtain a synthesized image, and setting the synthesized image to be a target image corresponding to the image capturing request.

According to a third aspect of the present disclosure, a non-transitory storage medium is provided and has a computer program stored in. The computer program is capable of being run by a processor of an electronic device to enable the electronic device to perform operations of: receiving an image capturing request for an object to be captured; performing an image capturing operation for the object to be captured via the first camera based on the image capturing request to obtain a first image, setting the first image to be a base image; performing another image capturing operation for the object to be captured via the plurality of second cameras to obtain a plurality of second images; and performing image synthesis for the plurality of second images and the base image to obtain a synthesized image, and setting the synthesized image to be a target image corresponding to the image capturing request.

BRIEF DESCRIPTION OF DRAWINGS

To further illustrate technical solutions of embodiments of the present disclosure more clearly, drawings for the embodiments will be briefly described hereinafter. Obviously, the drawings described in the following are some embodiments of the present disclosure. To any one of skill in the art can obtain other drawings based on the following drawings without any creative work.

DETAILED DESCRIPTION

Figure 1:
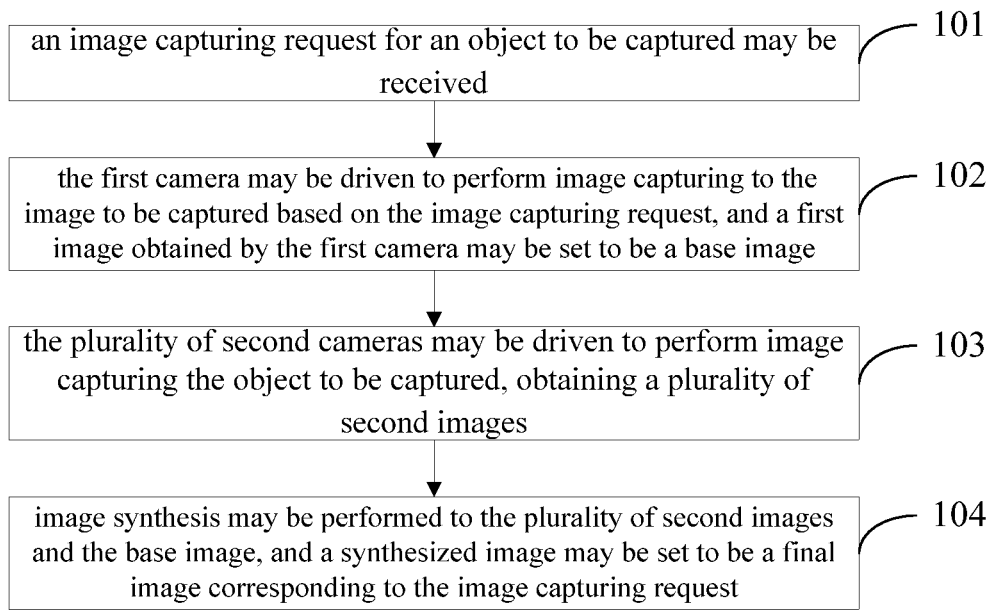
FIG. 1 is a flow chart of an imaging method according to an embodiment of the present disclosure.

As shown in the drawings, a same reference number represents a same element. A principle of the present disclosure may be illustrated by taking examples performed in an appropriate operating environment. Descriptions hereinafter are based on example embodiments of the present disclosure, and shall not be treated as a limit to other embodiments that are not illustrated in details in the present disclosure.

The present disclosure may provide an imaging method, and the method may be performed in an electronic device. A subject performing the method may be an apparatus of imaging provided in the present embodiment of the present disclosure or an electronic device integrating the apparatus of imaging. The apparatus of imaging may be realized in a form of hardware of software. The electronic device may be a device arranged with a processor, having a capability of processing, such as a smart mobile phone, a tablet computer, a personal digital assistant, a laptop computer, or a desktop computer and the like.

According to a first aspect of the present disclosure, an imaging method may be provided and performed by an electronic device. The electronic device includes a first camera in a first type and a plurality of second cameras in a second type, a second region captured by each of the plurality of second cameras partly overlap with a first region captured by the first camera at an edge part of the first region, and the method includes operations of: receiving an image capturing request for an object to be captured; performing an image capturing operation for the object to be captured via the first camera based on the image capturing request to obtain a first image, and setting the first image to be a base image; performing another image capturing operation for the object to be captured via the plurality of second cameras to obtain a plurality of second images; and performing image synthesis for the plurality of second images and the base image to obtain a synthesized image, and setting the synthesized image to be a target image corresponding to the image capturing request.

In some embodiments, the electronic device includes two first cameras, and the performing an image capturing operation for the object to be captured via the first camera based on the image capturing request to obtain a first image and setting the first image to be a base image includes: performing the image capturing operation for the object to be captured via the two first cameras to obtain at least two first images; and performing image synthesis for the at least two first images to obtain a synthesized first image, and setting the synthesized first image to be the base image.

In some embodiments, the performing image synthesis for the at least two first images to obtain a synthesized first image includes: aligning the at least two first images to make the at least two first images be wholly overlapped with each other; calculating each average pixel value of each overlapped pixel in the at least two first images; and obtaining the synthesized first image from the at least two first images according to each average pixel value of each overlapped pixel in the at least two first images.

In some embodiments, the performing an image capturing operation for the object to be captured via the first camera based on the image capturing request to obtain a first image and setting the first image to be a base image includes: performing a consecutive image capturing operation for the object to be captured to obtain a plurality of first images; and performing image synthesis for the plurality of first images to obtain a synthesized first image, and setting the synthesized first image to be the base image.

In some embodiments, the electronic device further includes an electrochromic assembly covering the first camera and the plurality of second cameras. Before the receiving an image capturing request for an object to be captured, the method further includes: switching the electrochromic assembly to be in a transparent state. After the performing image synthesis for the plurality of second images and the base image to obtain a synthesized image and setting the synthesized image to be a target image corresponding to the image capturing request, the method further includes: switching the electrochromic assembly to be in a colored state to hide the first camera and the plurality of second cameras.

In some embodiments, before the performing an image capturing operation for the object to be captured via the first camera based on the image capturing request to obtain a first image and setting the first image to be a base image, the method further includes: detecting whether the electronic device being in a shaking state; and performing the image capturing for the object to be captured via the first camera based on the image capturing request to obtain the first image, and setting the first image to be the base image, in response to the electronic device being not in the shaking state.

In some embodiments, before the performing an image capturing operation for the object to be captured via the first camera based on the image capturing request to obtain a first image and setting the first image to be a base image, the method further includes: further detecting whether the object to be captured being in a stationary state, in response to the electronic device being not in the shaking state; and performing the image capturing operation for the object to be captured via the first camera based on the image capturing request to obtain the first image and setting the first image to be the base image, in response to the object to be captured being in a stationary state.

In some embodiments, the first camera and the plurality of second cameras are arranged to share a same image sensor.

In some embodiments, the performing image synthesis to the plurality of second images and the base image to obtain a synthesized image and setting the synthesized image to be a target image corresponding to the image capturing request includes: aligning the base image and the plurality of second images respectively, such that the base image is partly overlapped with each of the second images at a corresponding edge part of the base image; obtaining an overlapped region between the base image and each of the plurality of second images; calculating an average pixel value of each overlapped pixel in the overlapped region correspondingly; and obtaining the synthesized image according to each average pixel value of each overlapped pixel in each overlapped region between the base image and each of the second images, and setting the synthesized image to be the target image corresponding to the image capturing request.

According to a second aspect of the present disclosure, an electronic device is provided and includes a processor, a non-transitory memory, a first camera in a first type and a plurality of second cameras in a second type. A second region captured by each of the second cameras partly overlaps with a first region captured by the first camera at an edge part of the first region, a computer program is stored in the non-transitory memory, and the processor is arranged to invoke the computer program to perform operations of: receiving an image capturing request for an object to be captured; performing an image capturing operation for the object to be captured via the first camera based on the image capturing request to obtain a first image, setting the first image to be a base image; performing another image capturing operation for the object to be captured via the plurality of second cameras to obtain a plurality of second images;

and performing image synthesis for the plurality of second images and the base image to obtain a synthesized image, and setting the synthesized image to be a target image corresponding to the image capturing request.

In some embodiments, the electronic device includes two first cameras. During the performing an image capturing operation for the object to be captured via the first camera based on the image capturing request to obtain a first image and setting the first image to be a base image, the processor is further arranged to invoke the computer program to perform operations of: performing the image capturing operation for the object to be captured via the two first cameras to obtain at least two first images; and performing image synthesis for the at least two first images to obtain a synthesized first image, and setting the synthesized first image to be the base image.

In some embodiments, during the performing image synthesis for the at least two first images to obtain a synthesized first image and setting the synthesized first image to be the base image, the processor is further arranged to invoke the computer program to perform operations of: aligning the at least two first images to make the at least two first images be wholly overlapped with each other; calculating an average pixel value of each overlapped pixel in the at least two first images; and obtaining the synthesized first image from the at least two first images according to each average pixel value of each overlapped pixel in the at least two first images.

In some embodiments, during the performing an image capturing operation for the object to be captured via the first camera based on the image capturing request to obtain a first image and setting the first image to be a base image, the processor is further arranged to invoke the computer program to perform operations of: performing a consecutive image capturing operation for the object to be captured via the first camera to obtain a plurality of first images; and performing image synthesis for the plurality of first images to obtain a synthesized first image, and setting the synthesized first image to be the base image.

In some embodiments, the electronic device further includes an electrochromic assembly covering the first camera and the plurality of second cameras. Before the receiving an image capturing request for an object to be captured, the processor is further arranged to invoke the computer program to perform operations of: switching the electrochromic assembly to be in a transparent state. After the performing image synthesis for the plurality of second images and the base image to obtain a synthesized image and setting the synthesized image to be a target image corresponding to the image capturing request, the processor is further arranged to invoke the computer program to perform operations of: switching the electrochromic assembly to be in a colored state to hide the first camera and the plurality of second cameras.

In some embodiments, before the performing an image capturing operation for the object to be captured via the first camera based on the image capturing request to obtain a first image and setting the first image to be a base image, the processor is further arranged to invoke the computer program to perform operations of: detecting whether the electronic device being in a shaking state; and performing the image capturing operation for the object to be captured via the first camera based on the image capturing request to obtain the first image, and setting the first image to be the base image, in response to the electronic device being not in the shaking state.

In some embodiments, before the performing the image capturing operation for the object to be captured via the first camera based on the image capturing request to obtain the first image, and setting the first image to be the base image, the processor is further arranged to invoke the computer program to perform operations of: further detecting whether the object to be captured being in a stationary state, in response to the electronic device being not in the shaking state; and performing the image capturing operation for the object to be captured via the first camera based on the image capturing request to obtain the first image, and setting the first image to be the base image, in response to the object to be captured being in the stationary state.

In some embodiments, the first camera and the plurality of second cameras are arranged to share a same image sensor.

In some embodiments, during the performing an image synthesis operation for the plurality of second images and the base image to obtain a synthesized image and setting the synthesized image to be a target image corresponding to the image capturing request, the processor is further arranged to invoke the computer program to perform operations of: aligning the base image and the plurality of second images respectively, such that the base image is partly overlapped with each of the plurality of second images at a corresponding edge part of the base image; obtaining an overlapped region between the base image and each of the plurality of second images; calculating an average pixel value of each overlapped pixel in the overlapped region correspondingly; and obtaining the synthesized image according to each average pixel value of each overlapped pixel in each overlapped region between the base image and each of the second images, and setting the synthesized image to be the target image corresponding to the image capturing request.

According to a third aspect of the present disclosure, a non-transitory storage medium is provided and has a computer program stored in. The computer program is capable of being run by a processor of an electronic device to enable the electronic device to perform operations of: receiving an image capturing request for an object to be captured; performing an image capturing operation for the object to be captured via the first camera based on the image capturing request to obtain a first image, setting the first image to be a base image; performing another image capturing operation for the object to be captured via the plurality of second cameras to obtain a plurality of second images; and performing image synthesis for the plurality of second images and the base image to obtain a synthesized image, and setting the synthesized image to be a target image corresponding to the image capturing request.

In some embodiments, during the performing image synthesis for the plurality of second images and the base image to obtain a synthesized image, and setting the synthesized image to be a target image corresponding to the image capturing request, the computer program is capable of being run by a processor of an electronic device enabling the electronic device to further perform operations of: aligning the base image and the plurality of second images respectively, such that the base image is partly overlapped with each of the second images at a corresponding edge part of the base image; obtaining an overlapped region between the base image and each of the plurality of second images; calculating an average pixel value of each overlapped pixel in the overlapped region correspondingly; and obtaining the synthesized image according to each average pixel value of each overlapped pixel in each overlapped region between the base image and each of the second images, and setting the synthesized image to be the target image corresponding to the image capturing request.

As shown in FIG. 1, a flow chart of an imaging method according to an embodiment of the present disclosure may be provided. The method may be performed by the electronic device provided in the present embodiment of the present disclosure. As shown in FIG. 1, the method according to the present embodiment of the present disclosure may include following operations.

In an operation of 101, an image capturing request for an object to be captured may be received.

It may be noted that, in the present embodiment, the electronic device may include a first camera in a first type and a plurality of second cameras in a second type. A first region to be captured by the first camera may include a second region to be captured by the plurality of second cameras. The second region to be captured by each of the plurality of second cameras may partly overlap the first region to be captured by the first camera at an edge part of the first region, and an overlapped capturing region between any two of the plurality of second cameras may overlap with a central part of the first region to be captured by the first camera.

Figure 2:
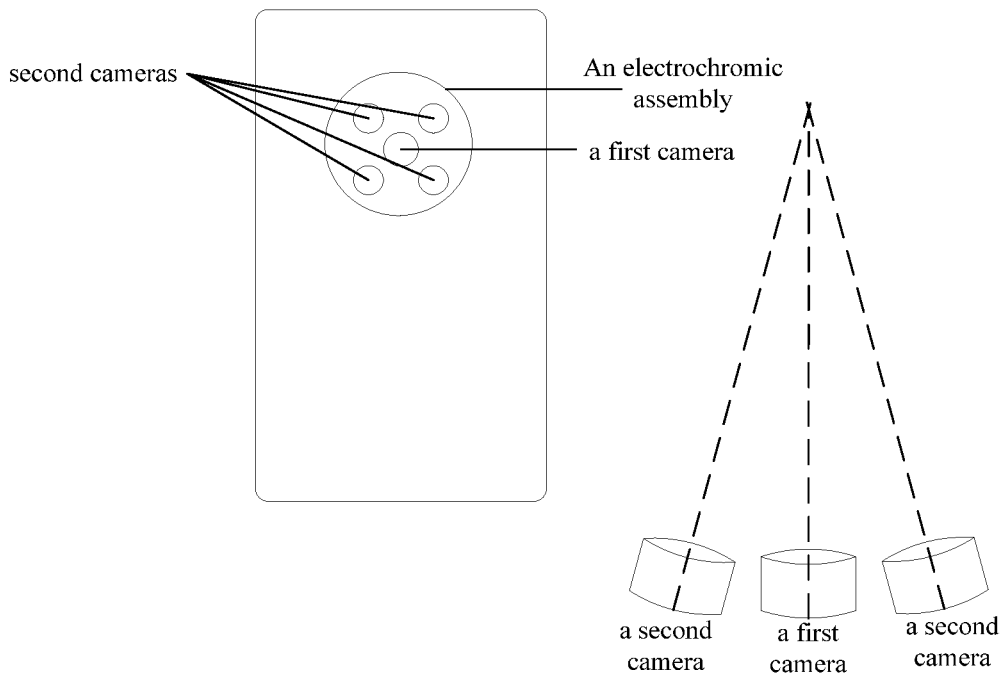
FIG. 2 is a diagram of an arrangement of a first camera and a second camera according to an embodiment of the present disclosure.
Figure 3:
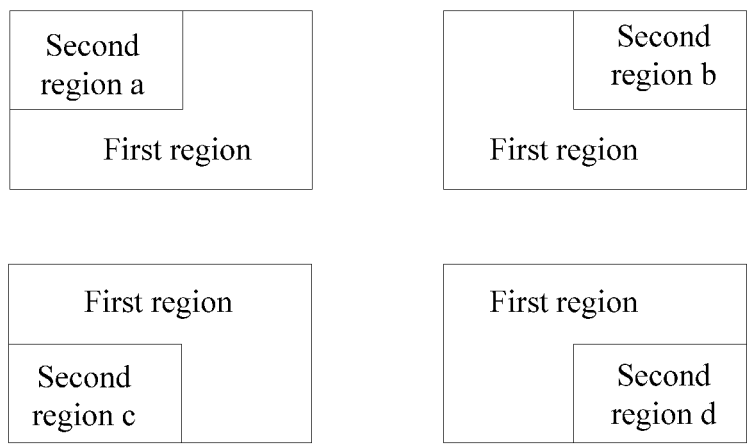
FIG. 3 is a view comparing a second region captured by a second camera with a first region captured by a first camera according to an embodiment of the present disclosure.
Figure 5:
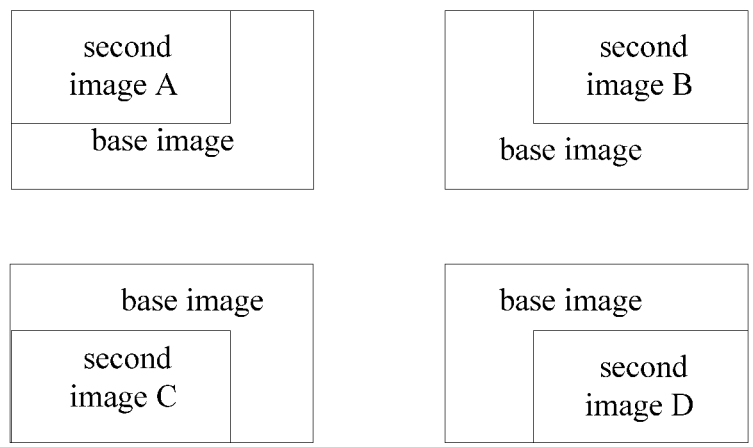
FIG. 5 is a view comparing image content in a second image and image content in a base image according to an embodiment of the present disclosure.
Figure 5A:
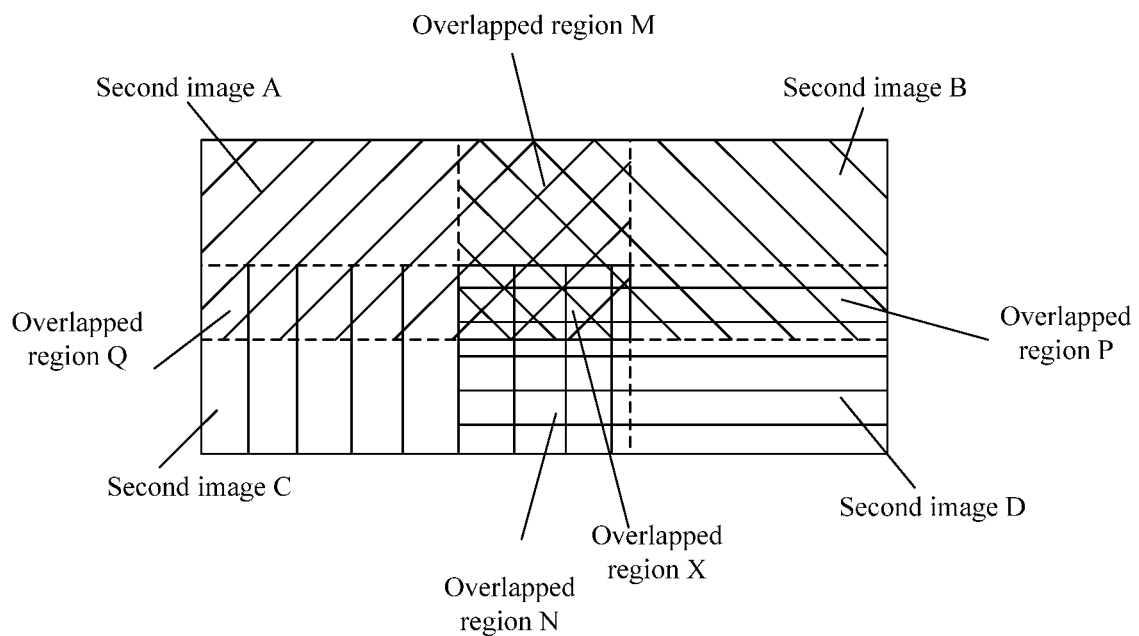
FIG. 5A is a view of overlapped regions between every two second images shown in FIG. 5.
Figure 6:
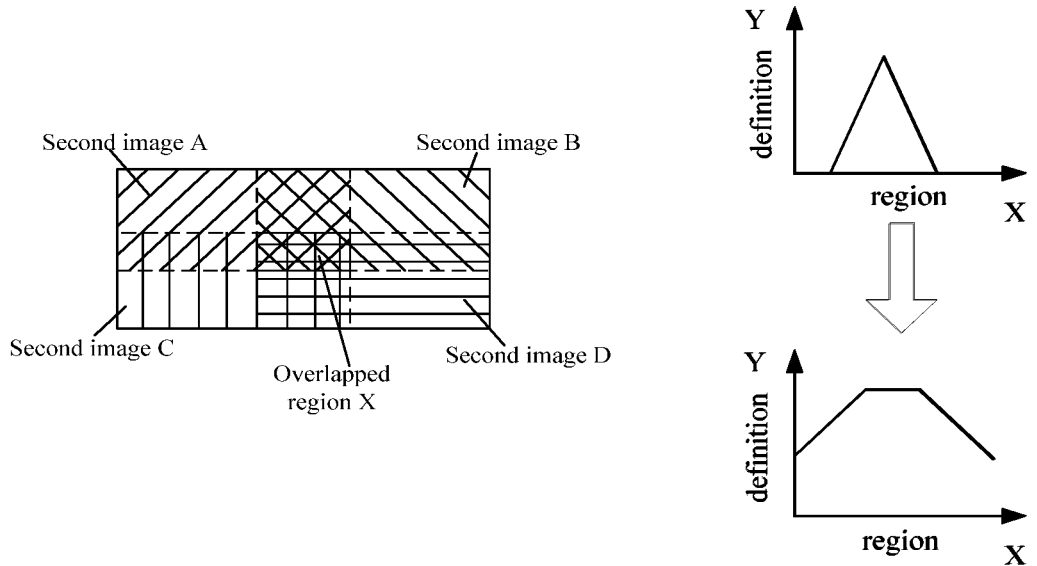
FIG. 6 is a view of an overlapped region when all second images and a base image overlap at the same time according to an embodiment of the present disclosure.

For example, as shown in FIG. 2 and FIG. 3, the first camera may be a camera of a typical type, and that is a camera having an angle of view of approximately 45 degrees. A second camera may be a telephoto camera, and that is a camera having an angle of view of less than 40 degrees. The electronic device may include one first camera and four second cameras, i.e., a second camera A, a second camera B, a second camera C, and a second camera D. An axis of each second camera may be tilted towards an axis of the first camera, and the axis of each second camera and the axis of the first camera may be intersected, such that a second region a captured by the second camera A may correspond to a top-left corner of the first region captured by the first camera, a second region b captured by the second camera B may correspond to a top-right corner of the first region captured by the first camera, a second region c captured by the second camera C may correspond to a bottom-left corner of the first region captured by the first camera, and a second region d captured by the second camera D may correspond to a bottom-right corner of the first region captured by the first camera. In such a way, the region captured by each second camera may partly overlap with the first region captured by the first camera at edge parts of the first region, and the overlapped region between any two of the plurality of second cameras (i.e., an overlapped portion between two regions captured by two second cameras) may overlap with the central part of the first region captured by the first camera. Specifically, the second camera A captures the second image A having the second region a, the second camera B captures the second image B having the second region b, the second camera C captures the second image C having the second region c, and the second camera D captures the second image D having the second region d. When each second image is aligned to a corresponding corner of the base image, the second region a and the second region b may have be overlapped and define an overlapped region M, the second region a and the second region c may have be overlapped and define an overlapped region Q, the second region b and the second region d may have be overlapped and define an overlapped region P, and the second region c and the second region d may have be overlapped and define an overlapped region N. The second region a and the second region d may be overlapped and define an overlapped region X, the overlapped region X is also defined by overlapping between the second region b and the second region c, and the overlapped region X is a central portion of the base image (as shown in FIG. 5A and FIG. 6)

In the present embodiment, the image capturing request may be inputted by a user directly to direct the electronic device to perform an image capturing operation for the object to be captured. The object to be captured may be an object aligned with the first camera while the image capturing request being received. The object may include, but is not limited to, a person, an article, scenery, and the like.

Figure 4:
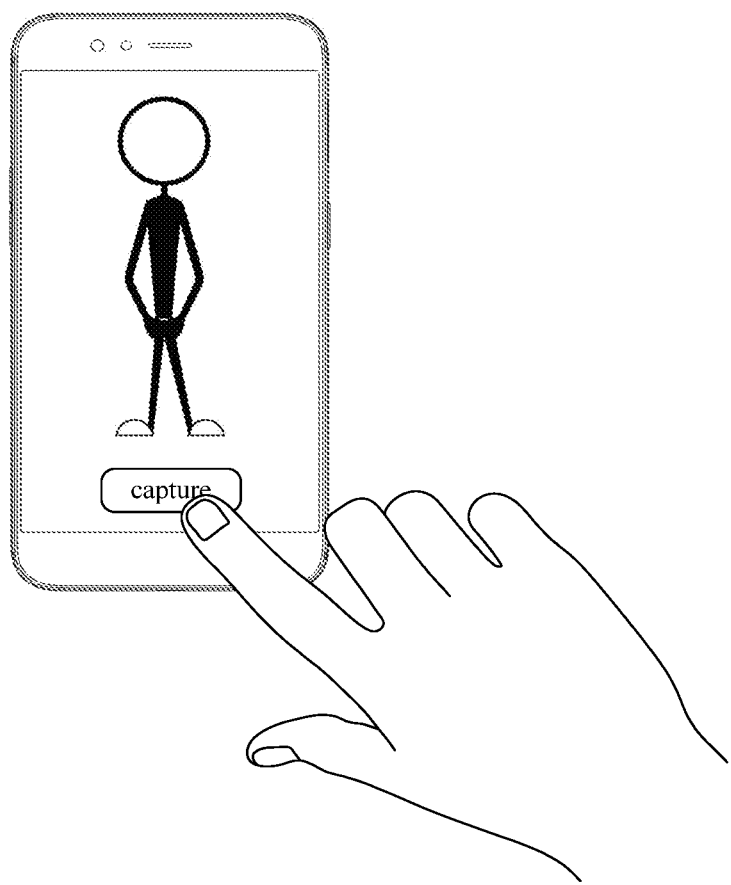
FIG. 4 is an application scenario showing a trigger of an input of an image capturing request according to an embodiment of the present disclosure.

For example, when the user is operating the electronic device to activate a camera-type application (such as a systemic application "camera" of the electronic device), the electronic device may be moved to allow the first camera and the plurality of second cameras to align with the object to be captured, a "capture" button (a virtual button) provided on a preview interface of the application "camera" may be clicked, and the image capturing request may be inputted into the electronic device, as shown in FIG. 4.

In another example, the user may operate the electronic device to activate the camera-type application. After the electronic device is moved to allow the first camera and the plurality of second cameras to align with the object to be captured, a voice request of "capture" may be spoken, such that the image capturing request may be inputted into the electronic device.

In an operation of 102, the first camera may be driven to perform an image capturing operation for the object to be captured based on the image capturing request to obtain a first image, and the first image may be set to be a base image.

For example, in response to the electronic device receiving the image capturing request for the object to be captured inputted by voice, the first camera may be driven to perform a capturing process to the object to be captured based on the request. An image obatined by the first camera may be recorded as the first image, and the first image may be set to be the base image.

In an operation of 103, the plurality of second cameras may be driven to perform the image capturing operation for the object to be captured, obtaining a plurality of second images.

In the present embodiment, the electronic device may perform another image capturing operation for the object to be captured via the plurality of second cameras arranged in the electronic device, and a plurality of images may be obtained. The plurality of images obtained by the plurality of second cameras may be recorded as a plurality of second images. That is, the plurality of second images may be obtained by the capturing process.

It may be noted that, during performing the another image capturing operation for the object to be captured via the plurality of second cameras, imaging capturing parameters (such as contrast and brightness) set in the plurality of second cameras for image capturing may be the same as those set in the first camera for image capturing. In such a way, the second region captured by each second camera may be a portion of the first region captured by the first camera, but imaging effects of the first image obtained by the first camera and the plurality of second images obtained by the plurality of second cameras may be identical.

For example, the electronic device may include four second cameras, i.e., the second camera A, the second camera B, the second camera C, and the second camera D. Second regions captured by the second camera A, the second camera B, the second camera C, and the second camera D may respectively correspond to the top-left corner, the top-right corner, the bottom-left corner, and the bottom-right corner of the first region captured by the first camera. Four second images may be obtained by the four second cameras. As shown in FIG. 5, image content in a second image A captured by the second camera A may correspond to image content of the top-left corner of the base image, image content in a second image B captured by the second camera B may correspond to image content of the top-right corner of the base image, image content in a second image C captured by the second camera C may correspond to image content of the bottom-left corner of the base image, and image content in a second image D captured by the second camera D may correspond to image content of the bottom-right corner of the base image. In such a way, different image content in different second images may cover different edge parts of the base image.

Specifically, as shown in FIG. 5A, the second camera A captures the second image A having the second region a, the second camera B captures the second image B having the second region b, the second camera C captures the second image C having the second region c, and the second camera D captures the second image D having the second region d. When each second image is aligned to a corresponding corner of the base image, the second region a and the second region b may have be overlapped and define an overlapped region M, the second region a and the second region c may have be overlapped and define an overlapped region Q, the second region b and the second region d may have be overlapped and define an overlapped region P, and the second region c and the second region d may have be overlapped and define an overlapped region N. The second region a and the second region d may be overlapped and define an overlapped region X, the overlapped region X is also defined by overlapping between the second region b and the second region c, and the overlapped region X is a central portion of the base image (as shown in FIG. 6).

It may be noted that, a sequence of performing the operation of 102 and the operation of 103 may not be limited by the present disclosure. The operation of 102 may be performed first, and the operation of 103 may be performed subsequently. Alternatively, the operation of 103 may be performed first and the operation of 102 may be performed subsequently. Alternatively, the operations of 102 and 103 may be performed at the same time.

In an operation of 104, image synthesis may be performed to the plurality of second images and the base image to obtain a synthesized image, and the synthesized image may be set to be a target image corresponding to the image capturing request.

In the present embodiment, after the electronic device obtains the base image via the first camera and the plurality of second images via the plurality of second cameras, the plurality of second images may be aligned with corresponding portions of the base image, i.e., the plurality of second images may be arranged to overlap with corresponding portions of the base image.

An overlapped region of the base image and the plurality of second images may be obtained after aligning, and an average pixel value of each overlapped pixel in the overlapped region may be calculated. For example, the electronic device may obtain the base image via the first camera and obtain the four second images via the four second cameras. As shown in FIG. 6, the overlapped region of all four second images and the base image may be located in a central part of the base image. In such a way, in the overlapped region shown in FIG. 6, values of a pixel of a certain point in five images (i.e., the base image and the four second images) may be equal to 0.8, 0.9, 1.1, 1.2, and 1, the average pixel value of the certain point may be equal to 1.

Subsequently, the synthesized image may be obtained based on the average pixel value of each corresponding pixel of each point in the base image. For example, a value of each pixel of the base image may be adjusted to each average pixel value obtained by calculations correspondingly, such that the synthesized image may be obtained. As another example, a new image may be generated based on each average pixel value obtained by calculations, and that is, the synthesized image may be obtained.

In the present embodiment, after the electronic device performs image synthesis to the plurality of second images and the base image, the synthesized image may be set to be the target image corresponding to the image capturing request. In such a way, the electronic device may complete an image capturing operation in response to the image capturing request.

For example, as shown in FIG. 6, definition changing from the base image to the target image is provided. An X-axis represents a position change across a region of an image, from an edge to a central part of the image region, and further from the central part to another edge of the image region. A Y-axis represents a definition change along the X-axis. It may be shown from the figure, in the base image, the central part of the base image may have a highest definition, and the definition of the base image may decreased from the central part to the edge of the base image, and the definition change may be dramatic. However, in the target image, the central part of the target image may have a highest definition, and the definition of an edge of the target image may be higher than that of the base image. The definition of the target image may decrease from the central part to the edge, but the definition change may be smooth, such that the general quality of the target image may be improved.

According to the above-mentioned embodiment, the electronic device may include a first camera in a first type and a plurality of second cameras in a second type. A second region captured by each of the plurality of second cameras may partly overlap with a first region captured by the first camera at an edge part of the first region, and an overlap capturing region between any two of the plurality of second cameras may overlap with a central part of the first region captured by the first camera. The electronic device may receive an image capturing request for an object to be captured, direct the first camera to perform the image capturing operation for the object to be captured based on the image capturing request, set a first image captured by the first camera to be a base image, drive the plurality of second cameras to perform the another image capturing operation for the object to be captured to obtain a plurality of second images, perform image synthesis to the plurality of second images and the base image, and set the synthesized image to be a target image corresponding to the image capturing request. In such a way, definition of an edge and a central part of the target image may be improved, and a definition variation in the target image may be smooth, improving the general quality of the entire image.

In one embodiment, the electronic device may include two first cameras, a process of performing the image capturing operation for the object to be captured via the first camera and setting the first image to be the base image may include following operations.

In an operation of (1), the image capturing operation may be performed to the object may be captured via the two first cameras, obtaining at least two first images.

In an operation of (2), image synthesis may be performed to the at least two first images to obtain a synthesized first image, the synthesized first image may be set to be the base image.

Figure 7:
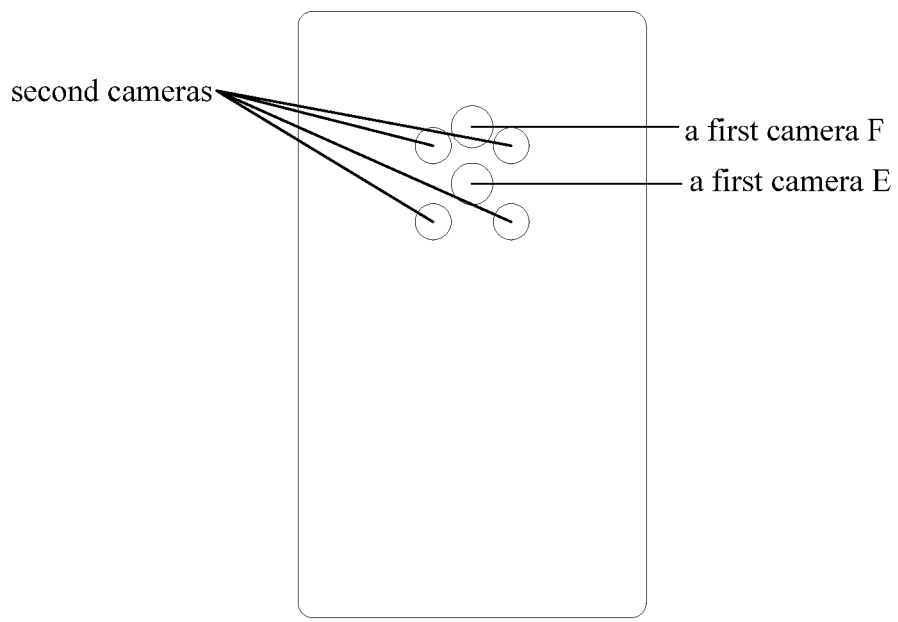
FIG. 7 is a diagram of another arrangement of a first camera and a second camera according to an embodiment of the present disclosure.

In the present embodiment, the electronic device may include two first cameras of a typical type. For example, as shown in FIG. 7, the electronic device may include two first cameras, i.e., a first camera E and a first camera F, and four second cameras may be arranged to surround the first camera E.

While the first camera is performing the image capturing operation for the object to be captured and setting the first image to be the base image, the electronic device may perform the image capturing operation for the object via the two first cameras to obtain at least two first images, and the at least two first images may have identical image content. Image synthesis may be performed to the at least two first images to obtain a synthesized first image, and the synthesized first image may be set to be the base image.

During the electronic device is performing image synthesis to the at least two first images, the at least two first images may be aligned first i.e., the at least two first images may be arranged to wholly overlap with each other first, each average pixel value of each overlapped pixel of the at least two first images may be calculated subsequently, and the synthesized first image of the at least two first images may be obtained based on each average pixel value. The synthesized first image may be set to be the base image.

Compared to the base image directly set based on the first image captured by the first camera, the base image in the present embodiment may have higher definition, such that the target image may have higher definition.

In one embodiment, a process of performing the image capturing operation for the object to be captured via the first camera and setting the first image to be the base image may include following operations.

In an operation of (1), the first camera may perform a consecutive image capturing operation for the object to be captured to obtain a plurality of first images.

In an operation of (2), image synthesis may be performed to the plurality of first images to obtain a synthesized first image, and the synthesized first image may be set to be the base image.

In the present embodiment, during performing the image capturing operation for the object to be captured via the first camera and setting the first image to be the base image, the electronic device may perform the consecutive image capturing operation for the object to be captured via the first camera based on the image capturing request to obtain a plurality of first images. The electronic device may perform the image capturing operation for the object to be captured via the first camera within a unit time period with a predefined capturing frame rate. For example, the predefined capturing frame rate of the first camera is 15FPS, the unit time period may be 1 second, and the electronic device may capture and obtain 15 images within 1 second. As all these images may correspond to a same object, and a time interval between every two images is relatively small, the image content in these images may be deemed to be identical.

After the plurality of first images of the object to be captured are obtained, the electronic device may select a first image having highest definition from the plurality of first images, align unselected first images of the plurality of first images with the first image having the highest definition, calculate each average pixel value of each overlapped pixel in the plurality of first images, and obtain a synthesized first image of the plurality of first images based on each average pixel value. The synthesized first image may be set to be the base image.

Compared to the base image directly set based on the first image capture captured by the first camera, the base image obtained in the present embodiment may have higher definition, such that the target image may have higher definition.

Alternatively, after the process of performing the consecutive image capturing operation for the object to be captured to obtain the plurality of first images, the method further include following operations.

The first image with the highest definition may be selected to be the base image, and image synthesis may be performed to the base image and the plurality of second images to obtain the target image.

Typically, an image with a higher definition may have a higher contrast. Therefore, the contrast of the image may be used to evaluate the definition of the image.

In one embodiment, the electronic device may further include an electrochromic assembly covering the first camera and/or the plurality of second cameras. Before the process of receiving the image capturing request for the object to be captured, the method further include following operations.

The electrochromic assembly may be switched into a transparent state.

After the process of performing image synthesis to the plurality of second images and the base image and setting the synthesized image to be the target image corresponding to the image capturing request, the method may further include following operations.

The electrochromic assembly may be switched into a colored state to hide the first camera and/or the plurality of second cameras.

In the present embodiment, the electrochromic assembly may be arranged to cover the first camera and/or the plurality of second cameras to improve integrity of the electronic device, such that cameras may be hidden by the electrochromic assembly according to situations.

An operational principle of the electrochromic assembly may be described in brief hereinafter.

Electrochromism may refer to a phenomenon of a stable and reversible change of a color/transparency of material under an applied electric field. Material with an electrochromic property may be referred as electrochromic material. In the present embodiment, the electrochromic assembly may be made of electrochromic material.

The electrochromic assembly may include two conductive layers, arranged to be stacked, and an electrochromic layer, an electrolytic layer, and an ion storage layer arranged between the two conductive layers. The two conductive layers may be transparent. For example, in response to no voltage (in other words, the voltage is 0V) applied to the two conductive layers of the electrochromic assembly, the electrochromic assembly may be in the transparent state. In response to the voltage applied to the two conductive layers changing from 0V to 3V, the electrochromic assembly may appear to be black. In response to the voltage applied to the two transparent conductive layers changing from 3V to −3V, an appearance of the electrochromic assembly may be changed from black to be transparent.

In such a way, the first camera and/or the plurality of second cameras may be hidden according to a color-adjustable property of the electrochromic assembly.

In the present embodiment, the electronic device may activate the camera application and switch the electrochromic assembly covering the first camera and/or the plurality of second cameras into the transparent state at the same time, such that the first camera and the plurality of second cameras may perform the another image capturing operation for the object to be captured.

After obtaining the base image via the first camera and the plurality of second images via the plurality of second cameras, synthesizing to obtain the target image, and deactivating the camera application, the electronic device may switch the electrochromic assembly into the colored state, such that the first camera and/or the plurality of second cameras may be hidden, i.e., invisible from an outside of the electronic device.

For example, the electronic device may be arranged with the electrochromic assembly covering all of the first camera and the plurality of second cameras, and a side of the electronic device arranged with the first camera and the plurality of second cameras is in a color of black. When the camera application is not activated, the electrochromic assembly may be switched to be and remained in a black state, such that the first camera and the plurality of second cameras are invisible from the outside of the electronic device. In response to the camera application being activated, the electrochromic assembly may be switched into the transparent state at the same time, such that the electronic device may perform the image capturing operation via the first camera and the plurality of second cameras. After the target image being obtained and the camera application being deactivated, the electronic device may switch the electrochromic assembly into the black state, such that the first camera and the plurality of second cameras may be invisible again.

In one embodiment, before the process of performing the image capturing operation for the object to be captured via the first camera based on the image capturing request and setting the first image to be the base image, the method may further include following operations.

In an operation of (1), it may be detected whether the electronic device is in a shaking state.

In an operation of (2), in response to the electronic device not in the shaking state, the electronic device may perform the image capturing operation for the object to be captured via the first camera based on the image capturing request and may set the first image obtained via the first camera to be the base image.

According to the above-mentioned embodiment, the target image may be synthesized based on different images captured by different cameras. In response to the electronic device being in the shaking state during performing the image capturing operation, the image content in the different images obtained via the different cameras may be significantly different, impacting a synthesis effect of the target image.

Therefore, in the present embodiment, in response to the electronic device receiving the image capturing request, whether or not the electronic device is in the shaking state may be detected firstly. Determination of the shaking state of the electronic device may be achieved by various means. For example, the electronic device may detect whether a moving speed of the electronic device along each direction of each dimension of a three-dimensional space is greater than a predefined speed. In response to the moving speed along each direction being greater than the predefined speed, a present state of the electronic device may be determined to be the shaking state. In response to the moving speed along each direction being not greater than the predefined speed, a present state of the electronic device may not be determined to be the shaking state. As another example, the electronic device may detect whether a displacing distance of the electronic device along each direction of each dimension of a three dimensional space is greater than a predefined displacing distance. In response to the displacing distance of the electronic device along each direction being greater than the predefined displacing distance, a present state of the electronic device may be determined to be the shaking state. In response to the displacing distance of the electronic device along each direction being not greater than the predefined displacing distance, a present state of the electronic device may not be determined to be the shaking state. In addition, the shaking state of the electronic device may be determined by other means that are not listed in the present disclosure, which will not be limited herein.

In response to the present state of the electronic device being determined to be not in the shaking state, the electronic device may perform the image capturing operation for the object to be captured via the first camera based on the image capturing request and set the first image obtained by the first camera to be the base image to synthesize and obtain the target image. Detailed operations may be referred to the above description and shall not be repeatedly described herein.

In one embodiment, before the process of performing the image capturing operation for the object to be captured via the first camera based on the image capturing request and setting the first image obtained by the first camera to be the base image, the method may further include following operations.

In an operation of (1), in response to the electronic device being not in the shaking state, the electronic device may detect whether the object to be capture is in a stationary state.

In an operation of (2), in response to the object to be captured being in the stationary state, the image capturing operation may be performed to the object via the first camera based on the image capturing request, and the first image obtained by the first camera may be set to be the base image.

According to the above description, any one of skill in the art shall understand that, in response to the electronic device being not in the shaking state and the object to be capture being not in the stationary state (for example, the object to be captured includes a moving object), the image content in images obtained by the first camera and the plurality of second cameras may be significantly different.

Therefore, in the present embodiment, in response to the electronic device determining the electronic device being not in the shaking state, the image capturing operation may not be performed immediately to the object to be captured via the first camera, but instead the electronic device may detect whether the object to be captured is in the stationary state. In response to the object to be captured being determined to be in the stationary state, the image capturing operation may be performed to the object via the first camera based on the image capturing request, and the first image obtained by the first camera may be set to be the base image for synthesizing and obtaining the target image. Detailed operations may be referred to the above descriptions, and will not be repeatedly described hereinafter.

Determining the object to be captured to be in the stationary state or not may be achieved by any one of skill in the art selecting an appropriate way according to actual demands, which will not be limited by the present disclosure. For example, an optical flow method, a residual method, and the like may be performed to determine whether the object to be captured is in the stationary state.

In one embodiment, the first camera and the plurality of second cameras may share a same image sensor.

Figure 8:
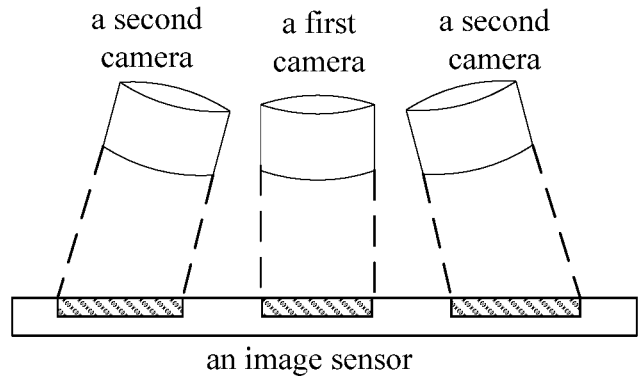
FIG. 8 is a diagram showing a first camera and a second camera sharing a same image sensor according to an embodiment of the present disclosure.

For example, as shown in FIG. 8, the first camera and the plurality of second cameras may share the same image sensor. The first camera (a lens portion) and the plurality of second cameras (a lens portion of each second camera) may project external light to different portions of the image sensor in a time-shared manner, such that image capturing of an external object may be achieved.

Compared to an arrangement of a plurality of cameras in the related art using different image sensors independently, a plurality of cameras share the same image sensor in the present disclosure may reduce an occupational space inside the electronic device.

Figure 9:
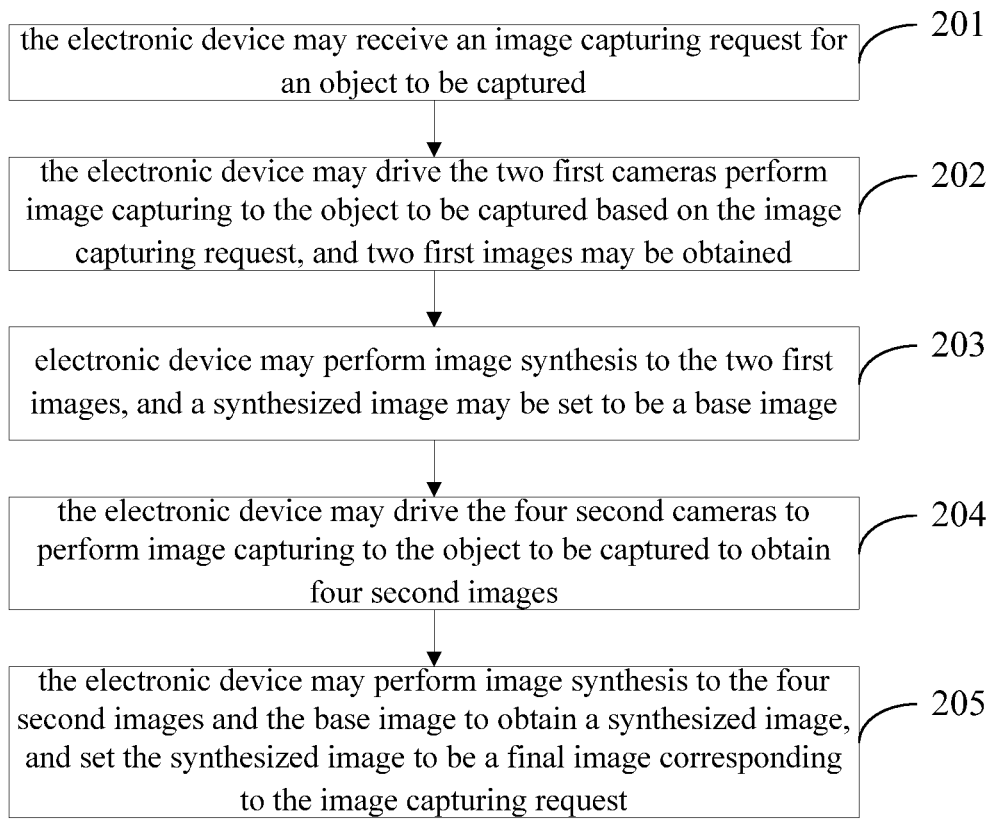
FIG. 9 is another flow chart of an imaging method according to an embodiment of the present disclosure.

As shown in FIG. 9, another flow chart of the imaging method is provided. The method may be performed by the electronic device provided in the present disclosure, for example, the electronic device may include two first cameras in the first type and four second cameras in the second type. First regions captured by the two first cameras may include second regions captured by the four second cameras. The second regions captured by the four second cameras may partly overlap with a first region captured by one of the two first cameras at an edge of the first region, and an overlap capturing region between any two of the four second cameras may overlap with a central part of the first region captured by the one of the two first cameras. The method may include following operations.

In an operation of 201, the electronic device may receive an image capturing request for an object to be captured.

As shown in FIG. 7, a first camera may be a camera of a typical type, and that is a camera having an angle of view of approximately 45 degrees. A second camera may be a telephoto camera, and that is a camera having an angle of view of less than 40 degrees. The electronic device may include two first cameras and four second cameras, i.e., a first camera E, a first camera F, a second camera A, a second camera B, a second camera C, and a second camera D. An axis of each second camera may be tilted towards an axis of the first camera E and intersected with the axis of the first camera E. A second region a captured by the second camera A may correspond to a top-left corner of a first region captured by the first camera E, a second region b captured by the second camera B may correspond to a top-right corner of the first region captured by the first camera E, a second region c captured by the second camera C may correspond to a bottom-left corner of the first region captured by the first camera E, and a second region d captured by the second camera D may correspond to a bottom-right corner of the first region captured by the first camera E. In such a way, the second regions captured by the four second cameras may partly overlap with the first region captured by the first camera E at edge parts of the first region, and the overlap capturing region between any two of the four second cameras (i.e., an overlap portion of two second regions captured by two second cameras) may overlap with the central part of the first region captured by the first camera E.

In the present embodiment, the image capturing request may be inputted by a user directly to direct the electronic device to perform the image capturing operation for the object to be captured. The object to be captured may be an object aligned with one of the two first cameras while the image capturing request being received. For example, the first camera aligned with the object may be the first camera surrounded by the four second cameras. The object may include, but is not limited to, a person, an article, scenery, and the like.

For example, when the user is operating the electronic device to activate a camera-type application (such as a systemic application "camera" of the electronic device), the electronic device may be moved to allow the two first cameras and the four second cameras to align with the object to be captured, a "capture" button (a virtual button) provided on a preview interface of the application "camera" may be clicked, and the image capturing request may be inputted into the electronic device, as shown in FIG. 4.

In another example, the user may operate the electronic device to activate the camera-type application. After the electronic device is moved to allow one of the two first camera and the four second cameras to align with the object to be captured, a voice request of "capture" may be spoken, such that the image capturing request may be inputted into the electronic device.

In an operation of 202, the electronic device may perform another image capturing operation for the object to be captured via the two first cameras based on the image capturing request, and two first images may be obtained.

In response to the electronic device receiving the image capturing request, the another image capturing operation may be performed for the object via the two first cameras based on the image capturing request to obtain two first images.

In an operation of 203, the electronic device may perform image synthesis to the two first images to obtain a synthesized first image, and the synthesized first image may be set to be a base image.

When the electronic device captures and obtains two first images via the two first cameras, the electronic device may perform image synthesis to the two first images and set the synthesized first image to be the base image.

For example, as shown in FIG. 7, the electronic device may align a first image captured by the first camera F with a first image captured by the first camera E, calculate each average pixel value of each overlapped pixel in the two first images, and obtain the synthesized first image based on each average pixel value. The synthesized first image may be set to be the base image.

In an operation of 204, the electronic device may perform the another image capturing operation for the object to be captured via the four second cameras to obtain four second images.

In the present embodiment, the electronic device may perform the another image capturing operation for the object to be captured via the four second cameras to obtain four images correspondingly, and the four images captured by the four second cameras may be recorded as second images, i.e., four second images may be obtained.

It may be noted that, during the four second cameras performing the another image capturing operation for the object, imaging capturing parameters (such as contrast and brightness) set in the four second cameras for image capturing and imaging capturing parameters set in the two first cameras for image capturing are identical. In such a way, the second regions captured by the four second cameras may be portions of the first regions captured by the two first cameras, but imaging effects of the first images and the second images may be identical.

For example, the electronic device may include four second cameras, i.e., the second camera A, the second camera B, the second camera C, and the second camera D. Second regions captured by the second camera A, the second camera B, the second camera C, and the second camera D may respectively correspond to the top-left corner, the top-right corner, the bottom-left corner, and the bottom-right corner of the first region captured by the first camera. Four second images may be obtained by the four second cameras. As shown in FIG. 5, image content in a second image A captured by the second camera A may correspond to image content of the top-left corner of the base image, image content in a second image B captured by the second camera B may correspond to image content of the top-right corner of the base image, image content in a second image C captured by the second camera C may correspond to image content of the bottom-left corner of the base image, and image content in a second image D captured by the second camera D may correspond to image content of the bottom-right corner of the base image. In such a way, different image content in different second images may cover different edge parts of the base image.

In an operation of 205, the electronic device may perform image synthesis to the four second images and the base image to obtain a synthesized image, and set the synthesized image to be a target image corresponding to the image capturing request.

In the present embodiment, after the electronic device obtains the base image via the two first cameras and the four second images via the four second cameras, the four second images may be aligned with the base image.

An overlapped region of the base image and the four second images may be obtained based on the aligned based image and the four second images, and each average pixel value of each overlapped pixel in the overlapped region may be calculated. For example, as shown in FIG. 6, the overlapped region of all four second images and the base image may be located in a central part of the base image. In such a way, in the overlapped region shown in FIG. 6, values of a pixel of a certain point in five images (i.e., the base image and the four second images) may be equal to 0.8, 0.9, 1.1, 1.2, and 1, the average pixel value of the certain point may be equal to 1.

Subsequently, the synthesized image may be obtained based on the average pixel value of each pixel of each point corresponding to the base image. For example, each pixel value of each pixel of the base image may be adjusted to the average pixel value obtained by calculations correspondingly, such that the synthesized image may be obtained. As another example, a new image may be generated based on each average pixel value obtained by calculations, and that is, the synthesized image may be obtained.

In the present embodiment, after the electronic device performs image synthesis to the four second images and the base image, the synthesized image may be set to be the target image corresponding to the image capturing request. In such a way, the electronic device may complete an image capturing process in response to the image capturing request.

For example, as shown in FIG. 6, definition changing from the base image to the target image is provided. An X-axis represents a position change across a region of an image, from an edge to a central part of the image region, and further from the central part to another edge of the image region. A Y-axis represents a definition change along the X-axis. It may be shown from the figure, in the base image, the central part of the base image may have a highest definition, and the definition of the base image may decreased from the central part to the edge of the base image, and the definition change may be dramatic. However, in the target image, the central part of the target image may have a highest definition, and the definition of an edge of the target image may be higher than that of the base image. The definition of the target image may decrease from the central part to the edge, but the definition change may be smooth, such that the general quality of the target image may be improved.

Figure 10:
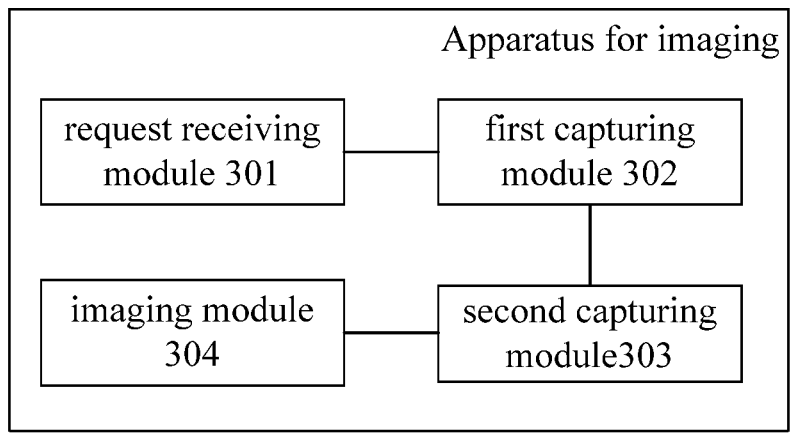
FIG. 10 is a structural diagram of an apparatus for imaging according to an embodiment of the present disclosure.

The present disclosure may further provide an apparatus for imaging. As shown in FIG. 10, a structural diagram of the apparatus for imaging is provided. The apparatus for imaging may be applied in an electronic device. The electronic device may include a first camera in a first type and a plurality of second cameras in a second type. The apparatus may include a request receiving module 301, a first capturing module 302, a second capturing module 303, and an imaging module 304.

The request receiving module 301 may be arranged to receive an image capturing request for an object to be captured.

The first capturing module 302 may be arranged to drive the first camera to perform the image capturing operation for the object to be captured based on the image capturing request and to set a first image obtained by the first camera to be a base image.

The second capturing module 303 may be arranged to drive the plurality of second cameras to perform the another image capturing operation for the object to be captured to obtain a plurality of second images.

The imaging module 304 may be arranged to perform image synthesis to the plurality of second images and the base image and to set a synthesized image to be a target image corresponding to the image capturing request.

In one embodiment, the electronic device may include two first cameras. During the electronic device performing the image capturing operation for the object to be captured via the two first cameras and setting first images to be the base image, the first capturing module 302 is arranged to perform following operations.

The image capturing operation may be performed for the object to be captured via the two first cameras to obtain at least two first images.

Image synthesis may be performed to the at least two first images, and a synthesized first image may be set to be the base image.

In one embodiment, during performing the image capturing operation for the object to be captured via the first camera and setting the first image to be the base image, the first capturing module 302 may be arranged to perform following operations.

A consecutive image capturing operation may be performed for the object to be captured via the first camera to obtain a plurality of first images.

Image synthesis may be performed to the plurality of first images to obtain a synthesized first image, and the synthesized first image may be set to be the base image.

In one embodiment, the electronic device may further include an electrochromic assembly covering the first camera and/or the plurality of second cameras, and the apparatus for imaging may further include an electrochromic module, arranged to perform following operations.

The electrochromic assembly may be switched into a transparent state before the request receiving module 301 receives the image capturing request for the object to be captured.

After the imaging module 304 performs image synthesis to the plurality of second images and the base image and set the synthesized image to be the target image corresponding to the image capturing request, the electrochromic assembly may be switched into a colored state, such that the first camera and/or the plurality of second cameras may be hidden, i.e., invisible from an outside of the electronic device.

In one embodiment, before the process of performing the image capturing operation for the object to be captured via the first camera based on the image capturing request and setting the first image to be the base image, the first capturing module 302 may further be arranged to perform following operations.

The first capturing module 302 may be arranged to detect whether the electronic device is in a shaking state.

In response to the electronic device being not in the shaking state, the image capturing operation may be performed for the object to be captured via the first camera based on the image capturing request to obtain the first image, and the first image may be set to be the base image.

In one embodiment, before the process of performing the image capturing operation for the object to be captured via the first camera and setting the first image to be the base image, the first capturing module 302 may further be arranged to perform following operations.

In response to the electronic device not being in the shaking state, the first capturing module 302 may be arranged to detect whether the object to be captured is in a stationary state.

In response to the object to be captured being in the stationary state, the image capturing operation may be performed for the object to be captured via the first camera based on the image capturing request to obtain the first image, and the first image may be set to be the base image.

In one embodiment, the first camera and the plurality of second cameras may be arranged to share a same image sensor.

It may be noted that, the apparatus of imaging in the present embodiment and the imaging method as described in the above are derived form a same invention concept. Any imaging method illustrated in the above embodiments may be performed in the apparatus of imaging. Detailed performance may be referred to the embodiments of the imaging method, and will not be repeatedly described hereinafter.

The present disclosure may provide a computer-readable non-transitory storage medium, having a computer program stored in. When the stored computer program is running in a computer, the computer may execute the operations included in the imaging method. The non-transitory storage medium may be a magnetic disc, an optical disc, a read-only memory (ROM), a random access memory (RAM), or the like.

Figure 11:
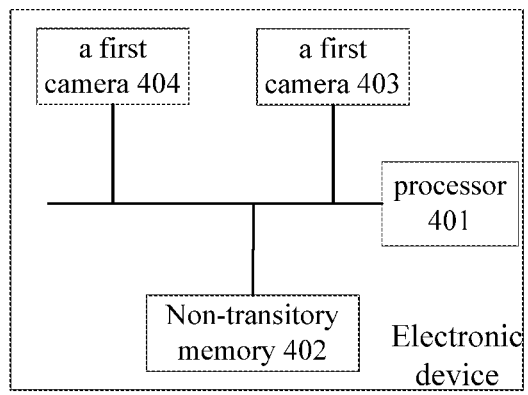
FIG. 11 is a structural diagram of an electronic device according to an embodiment of the present disclosure.

The present disclosure may further provide an electronic device, as shown in FIG. 11, the electronic device may include a processor 401, a non-transitory memory 402, a first camera 403 in a first type, and a plurality of second cameras 404 in a second type. The processor 401 may be electrically connected to the non-transitory memory 402, the first camera 403, and the plurality of second cameras 404.

The processor 401 may be a control center of the electronic device and may connect to each component of the electronic device via various interfaces and lines. The processor 401 may achieve various functions of the electronic device and process data by running or loading a computer program stored in the non-transitory memory 402 and invoking data stored in the non-transitory memory 402.

The non-transitory memory 402 may be arranged to store software programs and modules. The processor 401 may be arranged to run the computer program and the modules stored in the non-transitory memory 402 to execute various functional applications and perform data processing. The non-transitory memory 402 may substantially include a program storage area and a data storage area. The program storage area may be arranged to store an operating system, at least one computer program necessary for functioning (such as for audio playing, image displaying, and the like). The data storage area may be arranged to store data generated during electronic device running and the like. In addition, the non-transitory memory 402 may include a high-speed random access memory and non-volatile memory, such as at least one magnetic disc, a flash memory, or other non-volatile solid state storage device. Accordingly, the non-transitory memory 402 may further include a memory controller to provide access of the non-transitory memory 402 to the processor 401.

The first camera may be a camera of a typical type, and that is a camera having an angle of view of approximately 45 degrees.

Each of the plurality of second cameras may be a telephoto camera, and that is a camera having an angle of view of less than 40 degrees.

In the present embodiment, the processor 401 of the electronic device may load an instruction corresponding to a process of one or more computer programs into the non-transitory memory 402 by performing following operations, and the processor 401 may run the computer program stored in the non-transitory memory 402 to perform various functions.

An image capturing request for an object to captured may be received.

An image capturing operation may be performed for the object to be captured via the first camera 403 based on the image capturing request, and a first image obtained by the first camera may be set to be a base image.

Another image capturing operation may be performed for the object to be captured via the plurality of second cameras 404 to obtain a plurality of second images.

Image synthesis may be performed to the plurality of second images and the base image, and a synthesized image may be set to be a target image corresponding to the image capturing request.

Figure 12:
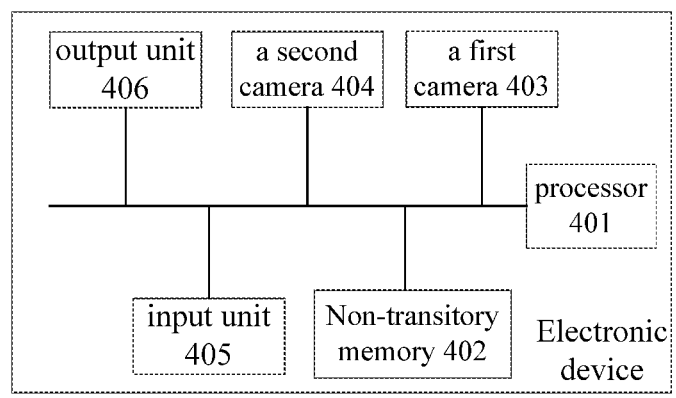
FIG. 12 is another structural diagram of an electronic device according to an embodiment of the present disclosure.

As shown in FIG. 12, another structural diagram of an electronic device according to an embodiment of the present disclosure is provided. Compared to the electronic device shown in FIG. 11, the electronic device in FIG. 12 may further include assemblies, such as an input unit 405 and an output unit 406.

The input unit 405 may be arranged to receive inputted numbers, character information, or user characteristic information (such as a fingerprint), and to generate an input signal related to a user setting and a functional control, such as an input signal of a keyboard, an input signal of a mouse, an input signal of a lever, an input signal of an optical or track ball, and the like.

The output unit 406, such as display screen, may be arranged to display information inputted by the user or information provided for the user.

In the present embodiment, the processor 401 of the electronic device may load an instruction corresponding to a process of one or more computer programs into the non-transitory memory 402 by performing following operations, and the processor 401 may run the computer program stored in the non-transitory memory 402 to perform various functions.

An image capturing request for an object to captured may be received.

The image capturing operation may be performed for the object to be captured via the first camera based on the image capturing request to obtain a first image, and the first image may be set to be a base image.

The another image capturing operation may be performed for the object to be captured via the plurality of second cameras to obtain a plurality of second images.

Image synthesis may be performed to the plurality of second images and the base image, and a synthesized image may be set to be a target image corresponding to the image capturing request.

In one embodiment, the electronic device may include two first cameras 403. During the process of performing the image capturing operation for the object to be captured via the first camera and setting the first image to be the base image, the processor 401 may be arranged to perform following operations.

The another image capturing operation may be performed for the object to be captured via the two first cameras 403 to obtain at least two first images.

Image synthesis may be performed to the at least two first images to obtain a synthesized first image, and the synthesized first image may be set to be the base image.

In one embodiment, during the process of performing the image capturing operation for the object to be captured via the first camera and setting the first image to be the base image, the processor 401 may further be arranged to perform following operations.

The image capturing operation may be performed for the object to be captured via the first camera 403 to obtain a plurality of first images.

Image synthesis may be performed to the plurality of first images to obtain a synthesized first image, and the synthesized first image may be set to be the base image.

In one embodiment, the electronic device may further include an electrochromic assembly covering the first camera 403 and/or the plurality of second cameras 404. Before receiving the image capturing request for the object to be captured, the processor 401 may be arranged to perform following operations.

The electrochromic assembly may be switched into a transparent state.

After performing image synthesis to the plurality of second images and the base image and setting the synthesized image to be the target image corresponding to the image capturing request, the processor 401 may further be arranged to perform following operations.

The electrochromic assembly may be switched into a colored state to hide the first camera 403 and/or the plurality of second cameras 404.

In one embodiment, before performing the image capturing operation for the object to be captured via the first camera 403 based on the image capturing request and setting the first image to be the base image, the processor 401 may further be arranged to perform following operations.

The processor 401 may be arranged to detect whether the electronic device is in a shaking state.

In response to the electronic device being not in the shaking state, the image capturing operation may be performed for the object to be captured via the first camera 403 based on the image capturing request, and the first image may be set to be the base image.

In one embodiment, before performing the image capturing operation for the object to be captured via the first camera 403 based on the image capturing request and setting the first image to be the base image, the processor 401 may further be arranged to perform following operations.

In response to the electronic device being not in the shaking state, the processor 401 may be arranged to detect whether the object to be captured is in a stationary state.

In response to the object to be captured being in a stationary state, the image capturing operation may be performed for the object to be captured via the first camera 403 based on the image capturing request, and the first image may be set to be the base image.

In one embodiment, the first camera 403 and the plurality of second cameras 404 may share a same image sensor.

It may be noted that, the electronic device provided in the present embodiment and the imaging method provided in the above embodiments are derived from a same invention concept. Any imaging method as described in the embodiments may be executed on the electronic device in the present embodiment, detailed process performed on the electronic device may refer to the embodiments of the imaging method, and will not be repeatedly described.

To be noted that, for the imaging method, any one of skill in the art may understand that performing all of or some of processes of the imaging method may be achieved by a computer program controlling related hardware. The computer program may be stored in a computer-readable non-transitory storage medium, such as stored in the non-transitory memory of the electronic device, and may be executed by at least one processor arranged in the electronic device. Processes shown in the embodiments of the imaging method may be performed during execution of the computer program. The non-transitory storage medium may be a magnetic disc, an optical disc, a ROM, a RAM, and the like.

In the apparatus of imaging according to the present embodiment, each functional module may be integrated into one processing chip, or each module may exist physically and separately, or two or more than two modules may be integrated into one module. The above-mentioned integrated module may be realized in a hardware form or in a form of software of functional modules. The integrated module in the form of software of functional modules and sold or used as an independent product may be stored in a computer-readable non-transitory storage medium, and the non-transitory storage medium may be a ROM, a magnetic disc, an optical disc, or the like.

The imaging method, the apparatus of imaging, the non-transitory storage medium, and the electronic device according to the embodiments of the present disclosure are illustrated in details in the above. Specific examples are described herein to illustrate the principle and implementations of the present disclosure. The above-mentioned embodiments are for the purpose of understanding the method and the essential concept of the present disclosure. At the same time, any one of skill in the art can make modifications to specific implementations and the scope of application based on the concept of the present disclosure. To summarize, the specification of the present disclosure shall be deemed as a limitation of the scope of the present disclosure.

What is claimed is:

1. A method of imaging, performed by an electronic device, the electronic device comprising a first camera in a first type and a plurality of second cameras in a second type, a second region captured by each of the second cameras overlapping with a portion of a first region captured by the first camera at an edge part of the first region, and the method comprising:

receiving an image capturing request for an object to be captured, performing an image capturing operation for the object to be captured via the first camera based on the image capturing request to obtain a first image, and setting the first image to be a base image;

performing another image capturing operation for the object to be captured via the plurality of second cameras to obtain a plurality of second images; and performing image synthesis for the plurality of second images and the base image to obtain a synthesized image, and setting the synthesized image to be a target image corresponding to the image capturing request, wherein the second region is completely covered by the first region, wherein any two second regions captured by any two second cameras of the plurality of second cameras are partly overlapped, generating an overlapping region, and wherein the overlapping region locates at a central part of the first region.

2. The method according to claim 1, wherein the electronic device comprises two first cameras, and the performing the image capturing operation for the object to be captured via the first camera based on the image capturing request to obtain the first image and setting the first image to be the base image, comprises:

performing the image capturing operation for the object to be captured via the two first cameras to obtain at least two first images; and performing image synthesis for the at least two first images to obtain a synthesized first image, and setting the synthesized first image to be the base image.

3. The method according to claim 2, wherein the performing image synthesis for the at least two first images to obtain the synthesized first image, comprises:

aligning the at least two first images to make the at least two first images be wholly overlapped with each other;

calculating each average pixel value of each overlapped pixel in the at least two first images; and obtaining the synthesized first image from the at least two first images according to each average pixel value of each overlapped pixel in the at least two first images.

4. The method according to claim 1, wherein the performing the image capturing operation for the object to be captured via the first camera based on the image capturing request to obtain the first image and setting the first image to be the base image comprises:

performing a consecutive image capturing operation for the object to be captured to obtain a plurality of first images; and performing image synthesis for the plurality of first images to obtain a synthesized first image, and setting the synthesized first image to be the base image.

5. The method according to claim 1, wherein the electronic device further comprises an electrochromic assembly covering the first camera and the plurality of second cameras; and the method further comprises:

before the receiving the image capturing request for the object to be captured, switching the electrochromic assembly to be in a transparent state; and after the performing the image synthesis for the plurality of second images and the base image to obtain the synthesized image and setting the synthesized image to be the target image corresponding to the image capturing request, switching the electrochromic assembly to be in a colored state to hide the first camera and the plurality of second cameras.

6. The method according to claim 1, further comprising:

before the performing the image capturing operation for the object to be captured via the first camera based on the image capturing request to obtain the first image and setting the first image to be the base image:

detecting whether the electronic device being in a shaking state; and performing the image capturing for the object to be captured via the first camera based on the image capturing request to obtain the first image, and setting the first image to be the base image, in response to the electronic device being not in the shaking state.

7. The method according to claim 6, further comprising:

before the performing the image capturing operation for the object to be captured via the first camera based on the image capturing request to obtain the first image and setting the first image to be the base image:

further detecting whether the object to be captured being in a stationary state, in response to the electronic device being not in the shaking state; and performing the image capturing operation for the object to be captured via the first camera based on the image capturing request to obtain the first image and setting the first image to be the base image, in response to the object to be captured being in a stationary state.

8. The method according to claim 1, wherein the first camera and the plurality of second cameras are arranged to share a same image sensor.

9. The method according to claim 1, wherein the performing the image synthesis to the plurality of second images and the base image to obtain the synthesized image and setting the synthesized image to be the target image corresponding to the image capturing request comprises:

aligning the base image and the plurality of second images respectively, such that the base image is partly overlapped with each of the second images at a corresponding edge part of the base image;

obtaining an overlapped region between the base image and each of the plurality of second images;

calculating an average pixel value of each overlapped pixel in the overlapped region correspondingly; and obtaining the synthesized image according to each average pixel value of each overlapped pixel in each overlapped region between the base image and each of the second images, and setting the synthesized image to be the target image corresponding to the image capturing request.

10. An electronic device, comprising a processor, a non-transitory memory, a first camera in a first type and a plurality of second cameras in a second type, wherein a second region captured by each of the second cameras overlaps with a portion of a first region captured by the first camera at an edge part of the first region, a computer program is stored in the non-transitory memory, and the processor is arranged to invoke the computer program to perform operations of:

receiving an image capturing request for an object to be captured, performing an image capturing operation for the object to be captured via the first camera based on the image capturing request to obtain a first image, setting the first image to be a base image;

performing another image capturing operation for the object to be captured via the plurality of second cameras to obtain a plurality of second images; and performing image synthesis for the plurality of second images and the base image to obtain a synthesized image, and setting the synthesized image to be a target image corresponding to the image capturing request,
wherein the second region is completely covered by the first region, wherein any two second regions captured by any two second cameras of the plurality of second cameras are partly overlapped, generating an overlapping region, and wherein the overlapping region locates at a central part of the first region.

11. The electronic device according to claim 10, further comprising two first cameras, and during the performing the image capturing operation for the object to be captured via the first camera based on the image capturing request to obtain the first image and setting the first image to be the base image, the processor is further arranged to invoke the computer program to perform operations of:
performing the image capturing operation for the object to be captured via the two first cameras to obtain at least two first images; and
performing image synthesis for the at least two first images to obtain a synthesized first image, and setting the synthesized first image to be the base image.

12. The electronic device according to claim 11, wherein during the performing the image synthesis for the at least two first images to obtain the synthesized first image and setting the synthesized first image to be the base image, the processor is further arranged to invoke the computer program to perform operations of:
aligning the at least two first images to make the at least two first images be wholly overlapped with each other;
calculating an average pixel value of each overlapped pixel in the at least two first images; and
obtaining the synthesized first image from the at least two first images according to each average pixel value of each overlapped pixel in the at least two first images.

13. The electronic device according to claim 10, wherein during the performing the image capturing operation for the object to be captured via the first camera based on the image capturing request to obtain the first image and setting the first image to be the base image, the processor is further arranged to invoke the computer program to perform operations of:
performing a consecutive image capturing operation for the object to be captured via the first camera to obtain a plurality of first images; and
performing image synthesis for the plurality of first images to obtain a synthesized first image, and setting the synthesized first image to be the base image.

14. The electronic device according to claim 10, wherein the electronic device further comprises an electrochromic assembly covering the first camera and the plurality of second cameras;
the processor is further arranged to invoke the computer program to perform operations of:
before the receiving the image capturing request for the object to be captured, switching the electrochromic assembly to be in a transparent state; and
after the performing the image synthesis for the plurality of second images and the base image to obtain the synthesized image and setting the synthesized image to be the target image corresponding to the image capturing request, switching the electrochromic assembly to be in a colored state to hide the first camera and the plurality of second cameras.

15. The electronic device according to claim 10, wherein before the performing the image capturing operation for the object to be captured via the first camera based on the image capturing request to obtain the first image and setting the first image to be the base image, the processor is further arranged to invoke the computer program to perform operations of:
detecting whether the electronic device being in a shaking state; and
performing the image capturing operation for the object to be captured via the first camera based on the image capturing request to obtain the first image, and setting the first image to be the base image, in response to the electronic device being not in the shaking state.

16. The electronic device according to claim 15, wherein before the performing the image capturing operation for the object to be captured via the first camera based on the image capturing request to obtain the first image, and setting the first image to be the base image, the processor is further arranged to invoke the computer program to perform operations of:
further detecting whether the object to be captured being in a stationary state, in response to the electronic device being not in the shaking state; and
performing the image capturing operation for the object to be captured via the first camera based on the image capturing request to obtain the first image, and setting the first image to be the base image, in response to the object to be captured being in the stationary state.

17. The electronic device according to claim 10, wherein the first camera and the plurality of second cameras are arranged to share a same image sensor.

18. The electronic device according to claim 10, wherein during the performing the image synthesis operation for the plurality of second images and the base image to obtain the synthesized image and setting the synthesized image to be the target image corresponding to the image capturing request, the processor is further arranged to invoke the computer program to perform operations of:
aligning the base image and the plurality of second images respectively, such that the base image is partly overlapped with each of the plurality of second images at a corresponding edge part of the base image;
obtaining an overlapped region between the base image and each of the plurality of second images;
calculating an average pixel value of each overlapped pixel in the overlapped region correspondingly; and
obtaining the synthesized image according to each average pixel value of each overlapped pixel in each overlapped region between the base image and each of the second images, and setting the synthesized image to be the target image corresponding to the image capturing request.

19. A non-transitory storage medium, having a computer program stored in, wherein the computer program is capable of being run by a processor of an electronic device enabling the electronic device to perform operations of:
receiving an image capturing request for an object to be captured,
performing an image capturing operation for the object to be captured via a first camera based on the image capturing request to obtain a first image, and setting the first image to be a base image;
performing another image capturing operation for the object to be captured via a plurality of second cameras to obtain a plurality of second images; and
performing image synthesis for the plurality of second images and the base image to obtain a synthesized image, and setting the synthesized image to be a target image corresponding to the image capturing request, wherein each of the plurality of second images overlaps with a portion of the first image at an edge part of the first image, wherein each of the plurality of second images is completely covered by the first image, wherein any two second images of the plurality of second images are partly overlapping, generating an overlapping region, and wherein the overlapping region locates at a central part of the first image.

20. The non-transitory storage medium according to claim 19, wherein during the performing the image synthesis for the plurality of second images and the base image to obtain the synthesized image, and setting the synthesized image to be the target image corresponding to the image capturing request, the computer program is capable of being run by a processor of an electronic device enabling the electronic device to further perform operations of:

aligning the base image and the plurality of second images respectively, such that the base image is partly overlapped with each of the second images at a corresponding edge part of the base image;

obtaining an overlapped region between the base image and each of the plurality of second images;

calculating an average pixel value of each overlapped pixel in the overlapped region correspondingly; and obtaining the synthesized image according to each average pixel value of each overlapped pixel in each overlapped region between the base image and each of the second images, and setting the synthesized image to be the target image corresponding to the image capturing request.

* * * * *